Robert B. Fosner
Maria G. Dunseth
Casimer C. Legal, Jr.
Lionel P. Schindler
INVENTORS BY Edward J. Hanson Jr.
ATTORNEY

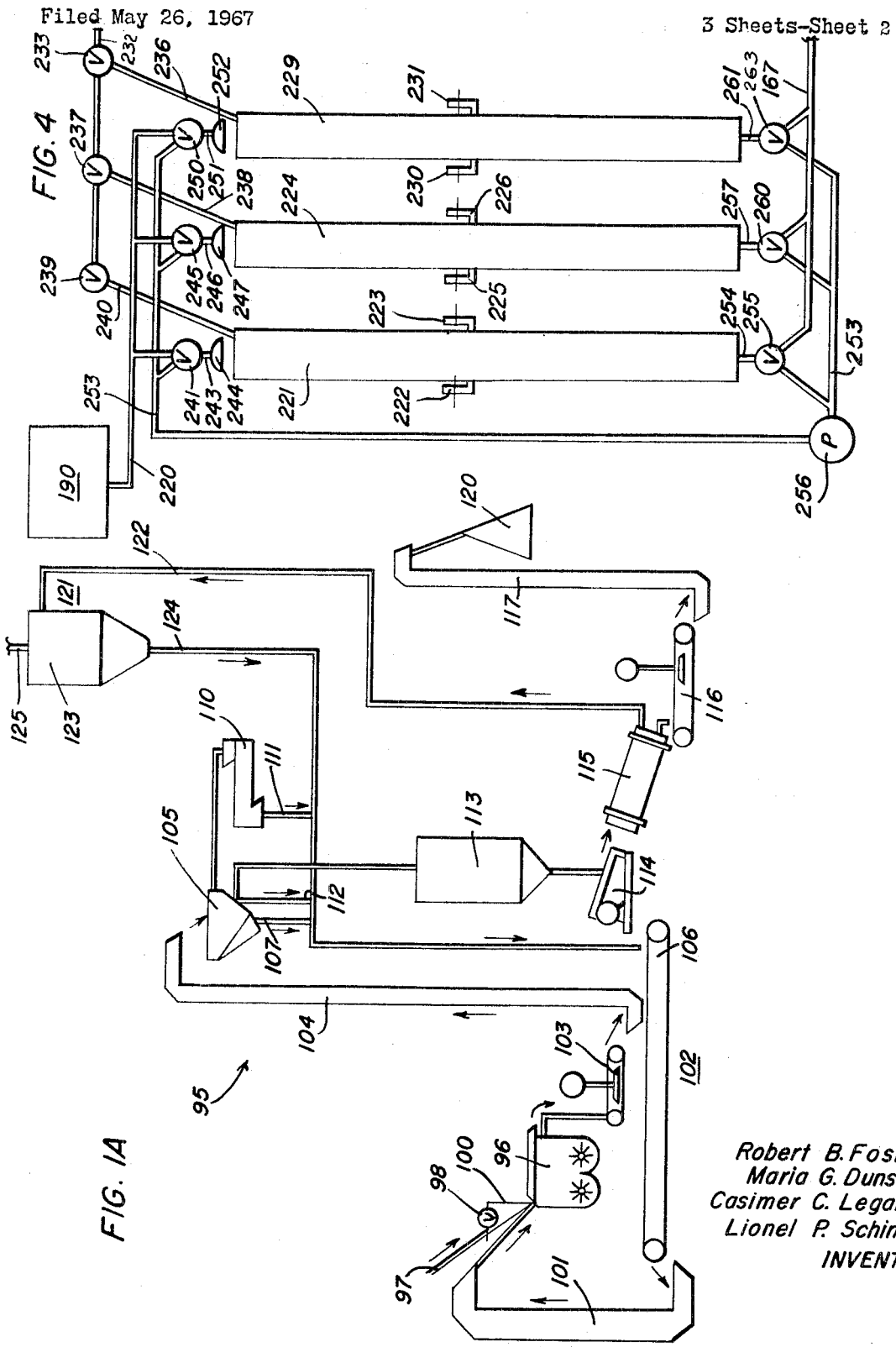

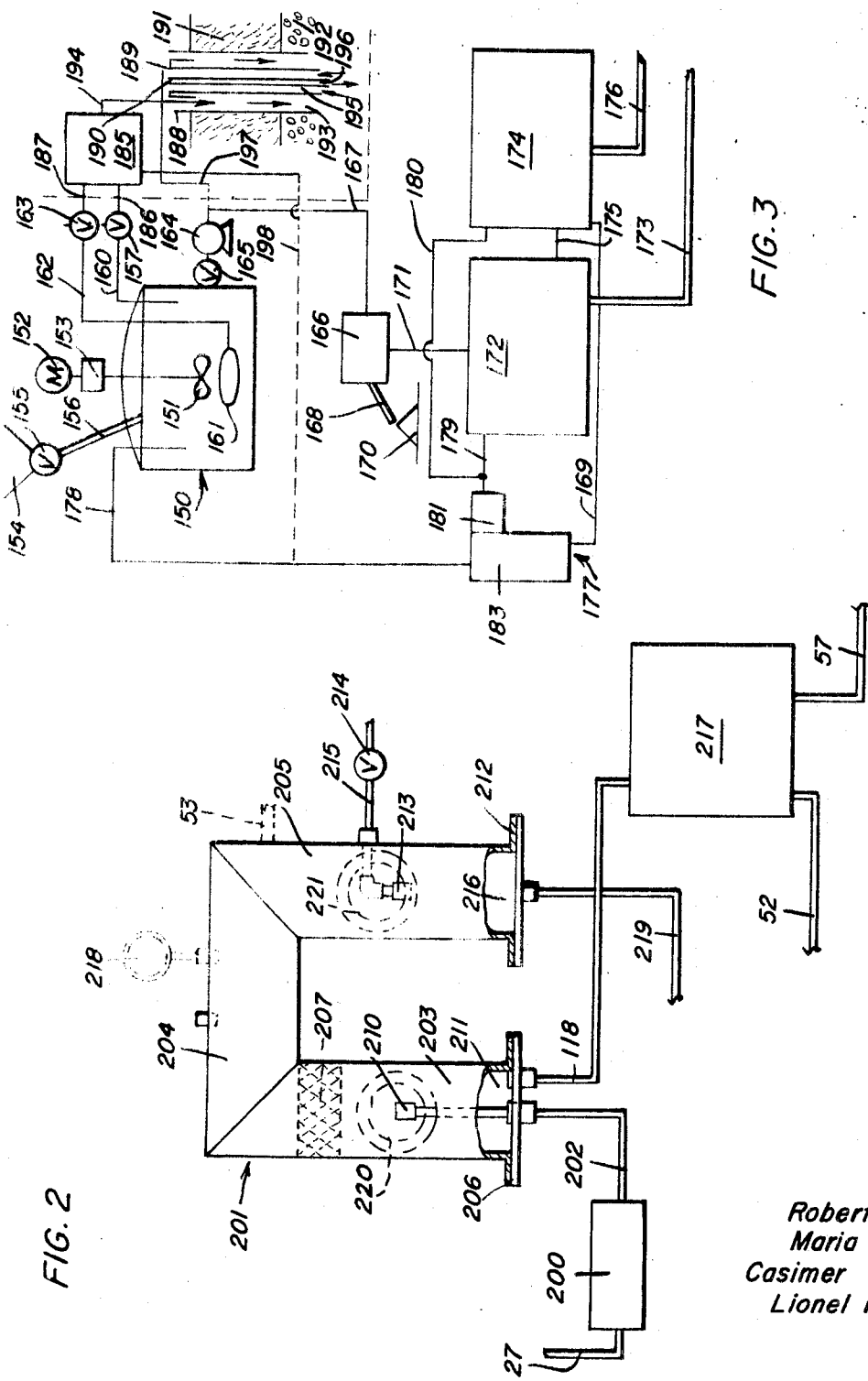

United States Patent Office 3,512,942
Patented May 19, 1970

3,512,942
APPARATUS FOR MINING AND
REFINING PHOSPHORUS
Robert B. Fosner, Laurel, Maria G. Dunseth, Baltimore, Casimer C. Legal, Jr., Elkridge, and Lionel P. Schindler, Baltimore, Md., assignors to W. R. Grace & Co., New York, N.Y., a corporation of Connecticut
Filed May 26, 1967, Ser. No. 641,840
Int. Cl. B03b 7/00, 9/00; C01b 25/28
U.S. Cl. 23—260                                       10 Claims

ABSTRACT OF THE DISCLOSURE

Apparatus for mining and refining phosphorus including means for extracting insoluble phosphorus from mineral phosphorus with $SO_2$ and water; a precipitator-separator for removing $SO_2$ vapor from the liquid, a reactor for treating solids from the precipitator-separator with water, $CO_2$ and $NH_3$; a reactor-precipitator for treating liquid from the reactor and means for lowering the N to P ratio of the precipitate coming from the reactor-precipitator and adjuvant elements and apparatus including a U-shaped flash precipitation chamber that includes an upwardly extending section, a bight section, a downwardly extending section and a nozzle and demister in the upwardly extending section.

This invention relates to a new combination of apparatus. In one specific aspect it relates to a combination of apparatus for converting natural phosphate rock to diammonium phosphate using sulfur dioxide, anhydrous ammonia, carbon dioxide and water. In another specific aspect it relates to a combination of apparatus for flashing a liquid and separating a vapor phase therefrom.

In carrying out one aspect of the present invention in one form thereof, there is provided an apparatus for manufacturing a diammonium phosphate material. The apparatus has a means for extracting insoluble phosphorus from mineral phopshorus at its upstream end. This means for extracting phosphorus from mineral phosphorus includes means for contacting the mineral phosphorus with $SO_2$ and water and disolving phosphorus therein. A means is provided for recovering the $SO_2$ and water with the dissolved phosphorus and for feeding the $SO_2$, water and dissolved phosphorus into a separator which removes any solids from the liquid phase. A precipitator-separator is connected by a connecting means to the separator's liquid connected to the separator's solids outlet.

The precipitator-separator is adapted to remove $SO_2$ vapor from the liquid, form a precipitate in the liquid and separate the precipitate from the liquid. A reactor is connected to the solids outlet of the precipitator-separator. The reactor has an agitator mounted in it. The agitator is equipped with a driving means. A liquid feed means communicates with the reactor for feeding water, $CO_2$ and $NH_3$ into the reactor. A separator for separating solids from liquids is connected to the reactor's outlet. A reactor-precipitator communicates with this separator's liquid outlet. The reactor-precipitator has an agitator and an ammonia sparger mounted in it. The agitator is equipped with a driving means. A separator for separating the solids and liquids is connected to the outlet from the reactor-precipitator and a means for lowering the N to P ratio of a charge of ammonium phosphate material is connected to the separator's solids outlet.

When the mineral phosphorus has already been mined the apparatus can desirably have, in one preferred embodiment, a means for extracting the phosphorus from the mineral phosphorus that includes two interconnected reactors. The first reactor has an agitator mounted in its equipped with a driving means and a variable speed transmission. A mixing pipe communicates with this reactor for feeding $SO_2$ and water into the reactor. An $SO_2$ feed line and a water feed line feed into the mixing pipe. A pump is connected through a valve means to the reactor for withdrawing the reaction mixture therefrom. The valve regulates the rate at which the pump can withdraw the reaction mixture from the reactor. A separator for separating solids from liquids is connected to the outlet side of the pump and the second reactor is connected to the separator's liquid outlet. An agitator equipped with a driving means and a variable speed transmission is mounted in the second reactor and a mineral phosphorus feed conduit communicates with the second reactor. It is desirable that the means for recovering the $SO_2$ and water with phosphorus dissolved in it and feeding them into the separator and having its liquid outlet connected to the precipitator-separator be a pump connected through a valve means to the second reactor for withdrawing the reaction mixture therefrom. The valve regulates the rate at which the pump can withdraw the reaction mixture from the reactor. The pump's outlet is connected to the separator that feeds liquid into the precipitator-separator.

In some instances the means for extracting the phosphorus from the mineral phosphorus after the mineral phosphorus has been mined is more preferably a single reactor having an agitator equipped with a driving means and a variable speed transmission mounted in it. A liquid feed line communicates with the reactor and feeds water into the reactor. A sparger is mounted in the reactor and adapted to feed $SO_2$ into the reactor. A flow regulator is connected to the sparger for controlling the flow rate of the sulfur dioxide. A conduit adapted to feed mineral phosphorus into the reactor communicates with the reactor.

In some instances the more preferable means for extracting the phosphorus from the mineral phosphorus after it has been mined includes three renewable leach beds arranged for continuous sequential leaching. A supply conduit separately communicates with each leach bed for separately and alternatively supplying mineral phosphorus to each of the renewable leach beds. A separate distributing head or means communicates with each leach bed for feeding the leaching solution to the top of the leach bed. A mixing mechanism is provided for mixing $SO_2$ and water. A water feed line and an $SO_2$ feed line feed into the mixing mechanism. A flow regulator is connected to the water feed line for controlling the rate of flow of water into the mixing mechanism and another flow regulator is connected to the $SO_2$ feed line for controlling the rate of flow of $SO_2$ into the mixing mechanism. The mixing mechanism communicates with each distributing head or means for separately and alternatively supplying an $SO_2$-water mixture to the renewable leach beds. Each of the leach beds has an outlet. Two separate leach solution collection lines are connected through a valve means to each of the renewable leach beds. The valve means for each leach bed alternatively supplies the leach solution from the leach bed to one or the other of the collection lines. A connecting means connects one of the leach solution collection lines with each of the distributing heads or means for separately and alternatively supplying leach solution to the renewable leach beds. Other means connect the other leach solution collection line with the separator that feeds liquid into the vacuum-heat precipitator and separator and together with that leach solution collection line serves as the means for recovering the $SO_2$ and water containing the dissolved phosphorus.

When the mineral phosphorus has not been mined the means for extracting the phosphorus from the mineral phosphorus is preferably a means for extracting the insoluble phosphorus from the phosphorus containing matrix in situ. By this means the phosphorus can be mined and partially refined in place without withdrawing the entire naturally occurring matrix from the ground. The apparatus for this includes, in a preferred embodiment, a mixing-propelling mechanism or means for mixing $SO_2$ and water and providing the force to inject the $SO_2$ and water solution into a natural phosphate matrix. A water feed line and an $SO_2$ feed line feed into the mixing and propelling mechanism. A flow regulator is connected to the water feed line and controls the rate at which the water flows into the mixing-propelling mechanism, and another flow regulator is connected to the $SO_2$ feed line and controls the rate at which the $SO_2$ flows into the mixing-propelling mechanism. At least two concentric mining pipes penetrate through a natural overburden into a natural phosphate matrix. The mixing-propelling mechanism feeds into the outer channel defined by the annulus between the outer concentric pipe and the next inwardly pipe. The next inwardly channel of the concentric pipes feeds outwardly and functions as the means for recovering the $SO_2$ and water with the dissolved phosphorus and feeding the $SO_2$-water and dissolved phosphorus into the separator that has its liquid outlet connected to the precipitator-separator.

When it is desired to fractionally precipitate the dissolved materials from the liquid phase that comes out of the separator that separates the solids and liquids in the originally recovered $SO_2$ and water containing the dissolved phosphorus it is preferable to include two precipitator-separators connected in series in the apparatus. A precipitator-separator is connected to the liquid outlet from the separator and the second precipitator-separator is connected to the liquid outlet of the first precipitator-separator. The $SO_2$ removing capacities of the precipitator-separators will also be varied depending upon the purpose of the particular vacuum-heat precipitator and separator. This will depend upon the product desired. The solids outlet from either one of the precipitator-separators can be connected to the reactor for treatment with water, $CO_2$ and $NH_3$. A recycle system is connected at its inlet end to the liquid outlet of the second precipitator-separator, and the vapor outlets of the first and second precipitator-separators. The outlet end of the recycle system is connected to the means for extracting insoluble phosphorus from mineral phosphorus and recycles the vapor materials and liquid materials into the means for extracting insoluble phosphorus from mineral phosphorus.

When it is desired to lower the N to P ratio of a charge of ammonium phosphate material passing through the apparatus by removing ammonia from the material, it is preferable to include a heater in the apparatus connected to the outlet from the last separator. The heater should have sufficient heating capacity to raise the temperature of an ammonium phosphate material passing through it from about 25° C. to 30°–40° C. and maintain that temperature level in the material for at least 5 minutes.

When it is desired to lower the N to P ratio of a charge of ammonium phosphate material passing through the apparatus by adding phosphorus to the material, it is preferable to include a mechanism for adding phosphoric acid to the ammonium phosphate material coming out of the outlet from the last separator in the apparatus. This mechanism is preferably a blunger with a liquid feed line feeding into it for supplying phosphoric acid. A set of fines, product and oversize screens is provided downstream from the blunger and a mill is provided downstream from the oversize screen for crushing the oversize. A conveyor downstream from the fines screen and the mill is adapted to receive the fines from the fines screen and from the mill and feed them into the blunger as recycle. A surge hopper downstream from the product screen receives the product sized granules and feeds into a rotary cooler.

By a further aspect of the present invention, in one preferred form thereof, there is provided a U-shaped flash precipitation chamber. This flash-precipitation chamber includes an upwardly extending section, a bight section extending substantially horizontally, and a downwardly extending section. A demister extends across an upper region of the upwardly extending section closing this section. A nozzle is mounted in the upwardly extending section and below the demister. A liquid heating heater is connected to the flash precipitation chamber. An outlet in the heater is connected by a conduit to the nozzle in the upwardly extending section of the flash chamber. An outlet is provided in the lower region of the upwardly extending section of the flash-precipitation chamber.

In a preferred embodiment, the U-shaped flash precipitation chamber is made by cutting a piece of cylindrical pipe at its top on a 45° bias to provide the upwardly extending section. The bight section is made from a piece of cylindrical pipe of the same radius, and both ends are cut on a 45° bias. The upwardly extending section and the bight section are joined by welding respective 45° bias cuts together to form a right angle connection. The downwardly extending section is also made from a piece of cylindrical pipe having the same radius, and its top is cut on a 45° bias. The other end of the bight section and the top of the downwardly extending section are joined by welding respective 45° bias cuts together to form a right angle connection. A closing plate closes the bottom of the upwardly extending section and another closing plate closes the bottom of the downwardly extending section. The heater for heating liquids has sufficient capacity to raise the temperature of a liquid passing through it from below 30° C. to above 35° C. The conduit connecting the outlet of the heater with the nozzle extends through the closing plate closing the bottom of the upwardly extending section. A separator for separating a solid from a liquid is connected to the outlet from the lower region of the upwardly extending section of the flash-precipitation chamber.

When it is desired to withdraw the vapors from the flash-precipitation chamber by entraining them in a liquid, a nozzle adapted to spray a gas entraining liquid is positioned in a medial region of the downwardly extending section. A liquid supply line is connected to the nozzle to supply the nozzle with a gas entraining liquid, and an outlet is provided through the closing plate that closes the bottom of the downwardly extending section to provide a liquid outlet.

When it is desired to withdraw the vapors from the flash-precipitation chamber in the vapor phase, a vacuum producing mechanism is connected to the flash-precipitation chamber for extracting the vapors. A conduit connects the vacuum producing mechanism to the downwardly extending section of the flash-precipitation chamber. A pressure gauge is connected to the bight section of the flash-precipitation chamber so that the vacuum may be monitored.

When it is desired to inspect the interior operation of of the flash-precipitation chamber an inspection glass is mounted in the cylindrical wall of the upwardly extending section of the flash-precipitation chamber adjacent to the nozzle positioned therein, so that the flashing may be visually monitored and a second inspection glass is mounted in the cylindrical wall of the downwardly extending section of the flash-precipitation chamber adjacent the nozzle positioned therein, so that the entrainment of the vapor may be visually monitored.

Further aspects of the present invention will become apparent hereinafter and the specification concludes with claims particularly pointing out and distinctly claiming the subject matter which we regard as our invention. The invention, however, as to organization and method of operation, together with other objects and advantages thereof, may best be understood by reference to the following description when taken in conjunction with the accompanying drawing, in which:

FIGS. 1 and 1A are diagrams showing the arrangement of the mechanisms of this invention;

FIG. 2 is a diagrammatic view showing the detailed construction of the precipitator-separator 26 of FIG. 1;

FIG. 3 is a diagrammatic view showing alternate forms of the first section of the mechanism of FIG. 1, through the precipitator-separator 26;

FIG. 4 is a diagrammatic view of an alternate form of the first section of the mechanism of FIG. 3, to the conduit 167 that feeds into separator 166.

Figure 1:
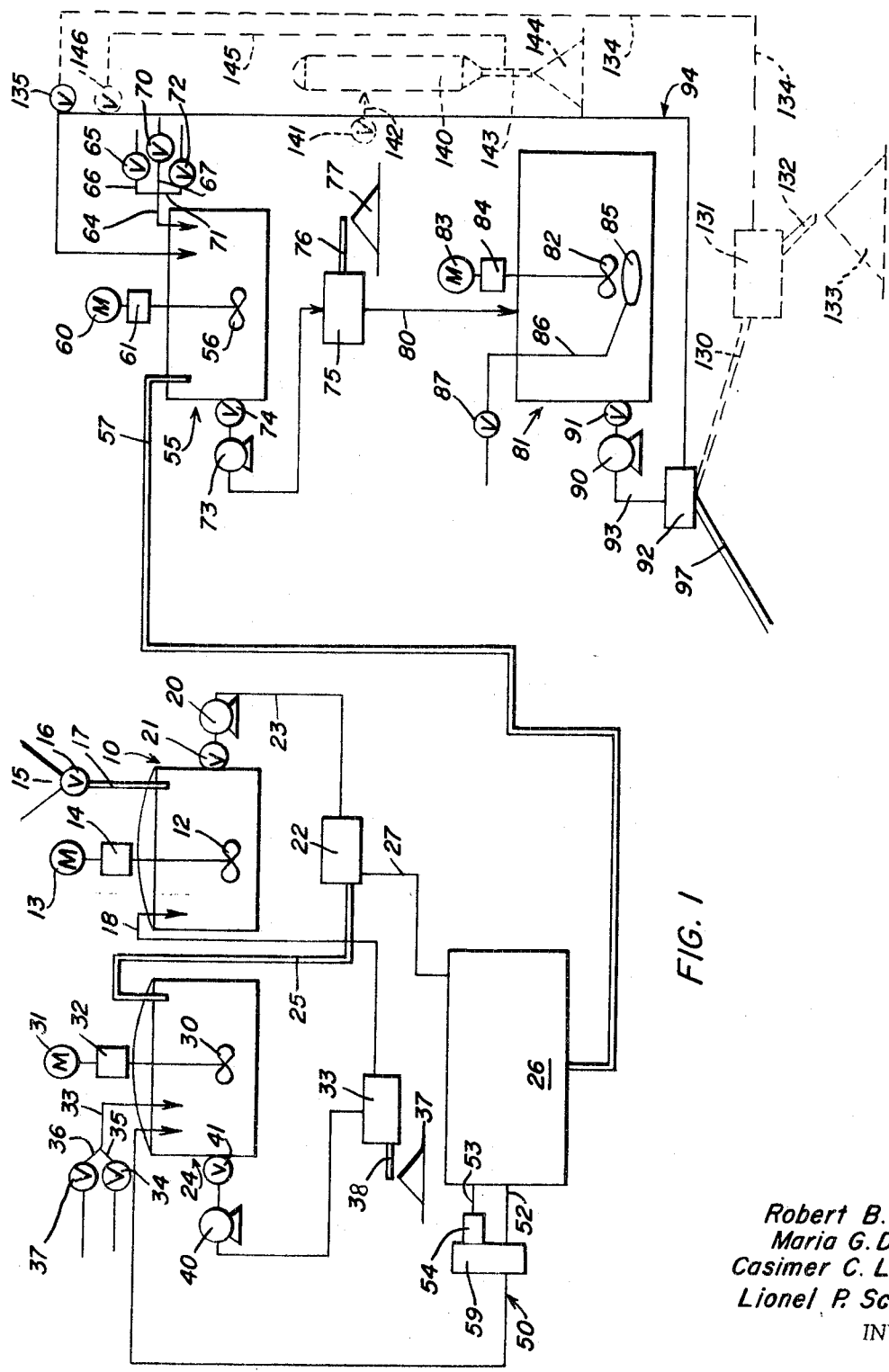

Referring first to FIGS. 1 and 1A of the drawings, the apparatus of this invention in a preferred embodiment, comprises in combination the following elements and/or features: (a) a reactor 10; (b) an agitator 12 is mounted in the reactor 10 (preferably a propeller type agitator, but a turbine type can be used), a driving means 13 (which can be, for example, an electric motor or steam driven motor) is connected to the agitator through a variable speed transmission 14; (c) mineral phosphorus is fed into the reactor 10 from hopper 15 via gate control valve 16 and feed channel 17; (d) a liquid feed line 18 feeds a liquid reactant into reactor 10; (e) pump 20 (suitably a diaphragm pump) withdraws the reaction mixture from reactor 10 through valve 21; (f) the reaction mixture is delivered by pump 20 to separator 22 (suitably a continuous centrifuge) to separate the solid phase (which generally includes unreacted or undissolved phosphorus with the siliceous impurities and other insoluble material) from the liquid phase (which contains phosphorus in soluble form along with a considerable amount of other soluble materials normally consisting mostly of calcium, aluminum, magnesium, fluorine and iron), the reactants are continuously withdrawn from reactor 10 by pump 20 and delivered via line 23 to separator 22; (g) reactor 24 receives the solid phase from separator 22 via conduit 25; (h) a precipitator-separator 26 receives the liquid phase from separator 22 via line 27; (i) an agitator 30 is mounted in the reactor 24 (the agitator is preferably the same as agitator 12) a driving means 31 is connected to the agitator through a variable speed transmission 32; (j) a mixing pipe 33 feeds into the reactor 24, water is fed into the mixing pipe 33 via valve 34 and line 35, sulfur dioxide is introduced into the mixing pipe 33 via line 36 and the rate of flow is controlled by the sulfur dioxide flow regulator 37; (l) pump 40 (suitably a diaphragm pump) withdraws the reaction mixture from reactor 24 through valve 41; (m) the reaction mixture is delivered by the pump 40 to separator 33 (suitably a continuous centrifuge) after it leaves the reactor 24 to separate the solid phase (which is normally predominately siliceous materials) from the liquid phase (which generally contains phosphorus in soluble form along with a considerable amount of other soluble materials normally consisting mostly of calcium, aluminum, magnesium, fluorine, iron, and untreated sulfurous acid), the reactants are continuously withdrawn from reactor 24 by pump 40 and delivered via line 42 to separator 33, the solids that are separated from the reactants coming from reactor 24 are discharged via conduit 38 to a suitable disposition area such as pile 37 and the liquid phase is discharged via line 18 into reactor 10; (n) a recycle system 50 receives the residual solution from the precipitator-separator and feeds it into reactor 24 (the recycle system 50 may include line 52 for withdrawing the liquid phase from the vacuum-heat precipitator and separator 26, line 53 which carries the vapor removed from the precipitator and separator 26 and it may include a compressor 54 which may also serve as an evacuator to produce vacuum in the precipitator-separator when desired; the vapor from line 53 and the liquid from line 52 may be recycled separately or the recycled material may be merged and fed in through a single line as shown; it may be desirable in certain instances to provide a mechanism for increasing the vapor absorption in the liquid by increasing the exposed liquid surface by spraying the liquid down while moving the vapor up countercurrently in a gas entraining mechanism 59; the precipitator-separator 26 may be a conventional multistage ash evaporator feeding into a continuous centrifuge or the mechanisms shown in detail in FIG. 2, the precipitator and separator 26 receives the phosphorous containing $SO_2$ solution from line 27 and removes $SO_2$ from the solution thereby precipitating phosphorous, and then separates the phosphorous containing precipitate from the liquid phase); (o) the phosphorous precipitate (which is largely dicalcium phosphate but includes a quantity of impurities) is delivered to an ammoniation and carbonation reactor 55; (p) an agitator 56 is mounted in reactor 55 (the agitator is preferably the same as agitator 12), a driving means 60 is connected to the agitator through a variable speed transmission 61; (q) a feed conduit 57 (which may be a direct interconnected conduit or may contain a series of pipes, troughs and conveyors depending on the vertical spacing and positioning that can be provided between the various mechanisms) feeds the phosphorus containing precipitate into reactor 55; (r) pipe line reactor 64 feeds the liquid reactants into reactor 55; (s) water is fed into the pipeline reactor 64 via valve 65 and line 66; (t) carbon dioxide is introduced into the pipeline reactor 64 via line 67 and the rate of flow is controlled by the carbon dioxide flow regulator 70; (u) anhydrous ammonia is introduced into the pipeline reactor 64 via line 71, and the rate of flow is controlled by the ammonia flow regulator 72 (the water, carbon dioxide and ammonia can be introduced into the reactor 55 separately, in which event is would be preferably to sparge the carbon dioxide and ammonia into the reactor 55 through separate concentric rings positioned under the agitator 56); (v) pump 73 (suitably a diaphragm pump) withdraws the reaction mixture from reactor 55 through valve 74; (w) the reaction mixture is delivered by pump 73 to separator 75 (suitably a continuous centrifuge) to separate the solid phase (which is largely calcium carbonate, generally with a substantial quantity of calcium sulfite) from the liquid phase (which is largely an ammonium phosphate solution), the solids that are separated from the reaction mixture coming from reactor 55 are discharged via conduit 76 to a suitable disposition area such as pile 77 and the liquid phase is discharged via line 80; (x) a reactor-precipitator 81; (y) an agitator 82 is mounted in the reactor-precipitator 81 (the agitator is preferably the same as agitator 12) with a driving means 83 connected to the agitator through a variable speed transmission 84; (z) the line 80 feeds an ammonium phosphate solution into reactor 81; (aa) anhydrous ammonia is introduced into reactor-precipitator 81 via perforated sparger ring 85 located immediately below the agitator 82 (ammonia is fed to the sparger ring 85 via line 86, and the rate of flow is controlled by ammonia flow regulator 87; (bb) pump 90 (suitably a diaphragm pump) withdraws the reaction mixture from reactor 81 through valve 91; (cc) the reaction mixture is delivered by pump 90 to a separator 92 (suitably a continuous centrifuge) to separate the solid phase (which is an ammonium phosphate) from the liquid phase, the reaction mixture is continuously withdrawn from reactor 81 by pump 90 and delivered via line 93 to separator 92; (dd) a recycle system 94 delivers the liquid phase or residual solution from separator 92 to reactor 55 (the recycle system is shown as a single delivery line, however, other mechanisms to be described subsequently may be included as optional desirable mechanisms); (ee) a granule forming section 95 (FIG. 1A); (ff) conduit 97 feeds the ammonium phosphate solid phase from the separator 92 to the granule forming section 95; (gg) a blunger 96 (suitably a pugmill) in the granule forming section; (hh) phosphoric acid is fed into the pugmill 96 via valve 98 and line 100 (the pugmill mixes, serves as a reactor and granulates the reactants); (ii) bucket elevator conveyor 101 feeds a volume of recycled fine granules into the pug mixer 96 at the same time the reactants are being fed into the pug mixer, bucket elevator 101 is part of the recycle system 102; (jj) a weigh belt 103 receives the discharge from the pug mixer; (kk) a conveyor 104 receives the material from the weigh belt 103 and elevates the material; (ll) a plurality of screens 105 receives the discharge from conveyor 103 for sizing to fines, oversize and product size: the fines are delivered to conveyor 106 directly from the screens via conduit 107; (mm) the oversize materials are shunted to a mill 110 where they are crushed and delivered via conduit 111 to conveyor 106 which is part of the fines recycle system 102, the conveyor 106 feeds the bucket conveyor 101 which delivers the fines into the pugmill 96, when sufficient fines and oversize material are not available for recycle conduit 112 feeds some of the product to conveyor 106; (nn) surge hopper 113 receives the balance of the product from the product sized screen; (oo) a vibrator 114 receives the fines from the surge hopper; (pp) a tumbler cooler 115 receives the granules from the vibrator and tumbles the granules in air and thereby lowers their temperature; (qq) a weigh belt 116 receives the granules from the cooler; (rr) a bucket elevator 117 receives the granules from the weigh belt 116 and transfers them to a suitable place of distribution such as granule storage pile 120; (ss) a cyclone dust system 121 is connected by duct work 122 to the cooler 115 (and at times by ducts to other mechanism of this invention), the dust or fines which settle in the cyclone separator 123 are fed by conduit 124 to the recycle on the belt 106 (the several conduits carrying fines to belt 106 may merge as shown or be separate), duct 125 leads from the cyclone separator 123 to an exhaust fan and stack (not shown).

An alternate mechanism for reducing the nitrogen to phosphorus ratio of the ammonium phosphate precipitate yielded by separator 92 is shown in FIG. 1 in broken lines. The solid ammonium phosphate coming from separator 92 is delivered into (a) conduit 130; (b) a heater 131 (the heater is suitably a rotary drum heater and has a capacity for heating the solid precipitate to about 85° C., which is sufficient to bring about a rapid stabilization of the wet ammonium phosphate precipitate against vaporization of ammonia with a retention time of 15 minutes) receives the ammonium phosphate from the conduit 130; (c) the solids are discharged from the heater via conduit 132 to a suitable disposition area such as pile 133; the ammonia vapor is discharged from the heater via line 134 into the recycle system 94 (the ammonia may either be delivered directly into the ammonia flow regulator 72 for introduction into pipe line reactor 64 via line 71 or added to the recycle in line 94 as shown in FIG. 1 through valve 135, alternatively the ammonia could be recycled to reactor-precipitator 81.

A separate alternate mechanism may be desirably added to the recycle system 94 when sulfur in the recycle solution builds up to excess amounts. Looking at FIG. 1 such a mechanism is shown, (a) crystallizer 140; (b) a shunting valve 141 may be included in the recycle system 94 to shunt a portion (for example, 30%) of the residual liquor from the main recycle line into line 142 for delivery into the crystallizer 140, crystals containing sulfur are formed in the crystallizer and delivered by conduit 143 to a suitable disposition area such as pile 144 and the purified liquid solution is delivered by line 145 into the main recycle line 94 through valve 146, of course the purified recycled solution could be fed directly to the reactor 55 through a separate line if preferable in a particular plant embodiment.

FIG. 3 shows one alternate arrangement of the combination of reactors 10 and 24, and separators 22 and 33 and the precipitator-separator 26 and their attendant adjuvant mechanisms shown in FIG. 1. Looking at FIG. 3 it may be seen that (a) a single reactor 150 is used to solubilize the phosphorus in the mineral phosphate; (b) an agitator 151 is mounted in the reactor 150 (the agitator is preferably the same as the agitators previously described, such as agitator 12), a driving means 152 is connected to the agitator through a variable speed transmission 153; (c) mineral phosphorus is fed into reactor 150 from hopper 154 via gate control valve 155 and channel 156; (d) water is fed into the reactor 150 via valve 157 and line 160; (e) sulfur dioxide is introduced into the reactor 150 via perforated sparger ring 161, which is located immediately below the agitator 151 (sulfur dioxide is fed to the sparger ring 161 via line 162 and the rate of flow is controlled by the sulfur dioxide flow regulator 163); (f) pump 164 (suitably a diaphragm pump) withdraws the reactants from reactor 150 through valve 165; (g) the reactants are delivered by the pump 164 to separator 166 (suitably a continuous centrifuge) to separate the solid phase (which is normally predominately siliceous material) from the liquid phase (which generally contains phosphorus in soluble form along with a considerable amount of other soluble materials normally consisting mostly of calcium, aluminum, magnesium, fluorine, iron and sulfurous acid), the reactants are continuously withdrawn from the reactor 150 by pump 164 and delivered via line 167 to separator 166, the solids that are separated from the reactants coming from reactor 150 are discharged via conduit 168 to a suitable disposition area such as pile 170 and the liquid phase is discharged via line 171; (h) a precipitator-separator 172 (which may be a conventional multi-stage flash evaporator feeding into a continuous centrifuge or the mechanisms shown in detail in FIG. 2) receives the liquid phase from the separator 166 via line 171 and removes $SO_2$ from the solution thereby precipitating phosphorus, the solids that are yielded by the precipitator-separator 172 are discharged via line 173; (j) a second precipitator-separator 174 receives the liquid phase from the precipitator-separator 172; (k) line 175 feeds the liquid phase from the precipitator-separator 172 to the precipitator-separator 174; (l) the solids that are yielded by the precipitator-separator 174 are discharged via line 176; (m) a recycle system 177 receives the residual solution from the precipitator-separator 174 via line 169 and feeds the solution into reactor 150 via line 178 (the recycle system 177 may include lines 179 and 180 which carry the vapors [$SO_2$ and water] removed from the precipitator-separators 172 and 174, the recycle system 177 may also include a compressor 181 which may also serve as an evacuator to produce a vacuum in the precipitator-separators 172 and 174, the vapor from lines 179 and 180 may be recycled separately or all of the recycle may be merged and fed through a single line 178 as shown, it may be desirable in certain instances to provide a mechanism for increasing the vapor absorption in the liquid by increasing the exposed liquid surface by spraying the liquid through a vapor stream in a mechanism 183). Depending upon the precipitates desired the amount of $SO_2$ extracted in each of the two precipitator-separators 172 and 174 may be varied to change the nature of the precipitate. Depending upon the product desired, either or both of the conduits 173 and 176 may be joined into conduit 57 of FIG. 1 to be processed through the ammoniation and carbonation reactor 55, the reactor-precipitator 81, and the granulator reducer 95 and their adjuvant mechanisms. In certain instances each of the conduits, 173 or 176, may enter into parallel ammoniation and carbonation reactors such as reactor 55 and be treated in separate but parallel systems to give different products or different grades of product.

Another alternate arrangement for solubilizing the phosphorus in the phosphorus mineral is shown set off by broken lines in FIG. 3: (a) a mixing propelling mechanism 185 mixes the $SO_2$ and water and provides the force to inject the $SO_2$ and water solution into a natural phosphate matrix (suitably the force may be provided by mixing the $SO_2$ and water in a closed chamber, both the $SO_2$ and water being delivered into the chamber under the desired pressure supplied in a suitable way, such as by pumps or by heating the $SO_2$ in a closed tank); (b) the water is supplied via line 186 and the rate of flow is controlled by the flow regulator 157; (c) the $SO_2$ is supplied via line 187 and the rate of flow is controlled by the flow regulator 163; (d) concentric mining pipes 188 and 189 and 190 penetrate through the natural overburden 191 and into a natural phosphate matrix 192 (the $SO_2$-water solution is fed into the outer channel 193 which is defined by the annulus between the outer concentric pipe 188 and the next inwardly pipe 189 by the mixing propelling mechanism 185 via line 194, the $SO_2$ water solution is forced into the matrix and dissolves the phosphorus contained in the matrix, the phosphorus containing solution is recovered from the matrix through the next inner channel 195 defined by the annulus between the second inwardly concentric pipe 189 and the inner concentric pipe 190, the inner concentric pipe 190 provides a channel 196 for supplying air, $SO_2$ or an inert gas to flush the solution from the matrix 192 (when the $SO_2$-water solution will flow back under its own pressure, it is not necessary to use the third concentric pipe 190, two concentric mining pipes being sufficient); and (1) line 197 feeds the recovered solution to separator 166 for processing as previously described, the recycle from recycle system 177 would be recycled to the mixing propelling mechanism 190 via line 198.

Attention is now directed to FIG. 2, where a particularly desirable precipitator-separator is shown. The precipitator-separator of FIG. 2 would be connected into the apparatus of FIG. 1 by merging the parts having common numbers; lines 27, 52, 53 and conduit 57 would thus be merged because they are the same elements; (a) heater 200 would be fed by the line 27 (suitably the heater 200 could be a heat exchanger and should have sufficient capacity to raise the solution passing through its from about 25° C. or lower to above 30° C.); (b) a flash precipitation chamber 201; (c) a line 202 feeds the heated solution from heater 200 into the flash precipitation chamber 201; (d) the flash-precipitation chamber 201 is U-shaped and has an upwardly extending section 203 that (e) merges with a bight section 204 which extends substantially horizontally to (f) a downwardly extending section 205 (each section is suitably constructed from a length of even-radius cylindrical piping with the joints cut on a 45° bias and joined by welding); (g) a closing plate 206 closes the bottom of the upwardly extending section 203; (h) a demister 207 extends across an upper region of the upwardly extending section 203 and closes the section against the passage of any significant quantity of liquid droplets; (i) line 202 passes into the upwardly extending section 203 through plate 206 and terminates in a nozzle 210 that sprays the solution into the upwardly extending section to obtain good vaporization during flashing; (j) the bottom of the upwardly extending section 203 serves as a catch basin 211 to catch the liquid phase that remains after flashing; (k) a closing plate 212 closes the bottom of the downwardly extending section 205; (l) a nozzle 213 is positioned in downwardly extending section 205 to spray a gas entraining liquid into the section to remove the gas vapor from the flash precipitation chamber; (m) a gas entraining liquid (suitably water) is supplied to nozzle 213 via valve 214 and line 215; (n) the bottom of the downwardly extending section 205 serves as a catch basin 216 to catch the liquid and entrained gas and line 219 feeds this gas rich liquid to the recycle system 50 (FIG. 1), and may feed directly into line 52; a separator 217 (suitably a continuous centrifuge) receives the liquid phase and the precipitate that forms in it from catch basin 211 through line 218 (if sufficient retention time is not provided in the catch basin 211 for a good precipitation to occur, an intervening precipitation tank may be provided in line 218), line 52 (FIG. 1) feeds the liquid from the separator 217 into the recycle system 50 and conduit 57 feeds the solids from the separator 217 into reactor 55 (FIG. 1).

Still looking at FIG. 2, an alternate mechanism may be provided for extracting the vapor phase from the flash precipitator by connecting line 53 shown in dotted lines on FIG. 2 and solid lines in FIG. 1 to the downwardly extending section 205 of the flash-precipitator. The vapor could thus be directly withdrawn from the flash precipitator under a vacuum provided by compressor 54 of FIG. 1. The pressure could be read on gauge 218, FIG. 2. Inspection glasses 220 and 221 mounted in the sections 203 and 205 respectively of the flash precipitator are shown in dotted lines in FIG. 2. The inspection glasses provide a means for visually monitoring the operation of the flash precipitator.

Another alternate arrangement for solubilizing the phosphorus in the phosphorus mineral is shown in FIG. 4: (a) a line 220 is fed by the mixing and propelling mechanism 190 of FIG. 3 (this alternate system may provide no more propelling pressure than the hydrostatic pressure of an elevated location); (b) a first renewable leach bed 221 (suitably a dumpable tank equipped with dumping means depicted as trunnions 222 and 223 on which the tank may be rotated to dump); (c) a second renewable leach bed 224 (suitably a dumpable tank equipped with dumping means depicted as trunnions 225 and 226 on which the tank may be rotated to dump) and (d) a third renewable leach bed 229 (suitably a dumpable tank equipped with dumping means depicted as trunnions 230 and 231 on which the tank may be rotated to dump); (e) a supply conduit 232 for separately supplying mineral phosphorus to each of the renewable leach beds and having 3 gate valves (gate valve 233 feeding to leach bed 229 via spout 236, gate valve 237 feeding to leach bed 224 via conduit 238, and gate valve 239 feeding into leach bed 221 via conduit 240); (f) line 220 feeds to a 3-way valve 241 which may direct the feed to conduit 243 which feeds to distributing head or feeding outlet (suitably a sprinkler) 244 which charges the leaching solution to leach bed 221; (g) line 220 also feeds to a 3-way valve 245 which may direct the feed to conduit 246 which feeds to distribution head or feeding outlet (suitably a sprinkler) 247 which charges the leaching solution to leach bed 224; (h) line 220 also feeds to 3-way valve 250 which may direct the feed to conduit 251, which feeds to a distribution head or feeding outlet (suitably a sprinkler) 252 which charges the leaching solution to leach bed 229 (thus the $SO_2$ water solution may be fed into one of the three leach beds via the 3-way valves); (i) a first leach solution also feeds to the 3-way valves via line 253, line 253 feeds into each of the 3-way valves 241, 245, and 250 in the same manner as line 220, each valve also has an off position, therefore, each bed can be charged from line 220 or 253 or shut down depending on the respective valve position; (j) each of the leach beds has an outlet, leach bed 221 has an outlet 254 that feeds into a three way valve 255, the valve 255 may direct the leach to line 167 (see FIG. 1) or to first leach solution line 253 via pump 256; (k) leach bed 224 has an outlet 257 that feeds into a three way valve 260, the valve 260 may direct the leach to line 167 or to first leach solution line 253 via pump 256; (l) leach bed 229 has an outlet 261 that feeds into a three-way valve 262, the valve 262 may direct the leach to line 167 or to the first leach solution line 253 via pump 256, each of the 3-way valves 255, 260 and 262 also has an off position.

While in accordance with the patent statutes, we have described what at present is considered to be the preferred embodiment of this invention, it will be obvious to those skilled in the art that various changes and modifications may be made therein without departing from the present invention, and we, therefore, aim in the following claims to cover all such equivalent variations as fall within the true spirit and scope of this invention.

We claim:

1. Apparatus comprising in combination; a means for extracting insoluble phosphorus from mineral phosphorus, said means including a first reactor means for contacting said mineral phosphorus with $SO_2$ and water; a first separator for separating solids from liquids and having a liquid outlet and a solids outlet; means for recovering the $SO_2$ and water with the dissolved phosphorus and for feeding the $SO_2$, water and dissolved phosphorus into said first separator to remove any solids from the liquid phase; a first precipitator-separator for removing $SO_2$ vapor from the liquid having liquid and vapor outlets, forming a precipitate in the liquid and separating the precipitate from the liquid; connecting means connecting said first precipitator-separator to said first separator's liquid outlet; a second reactor connected to the solids outlet of said first precipitator-separator; an agitator mounted in said reactor and equipped with driving means; liquid feed means communicating with said second reactor for feeding water, $CO_2$ and $NH_3$ into said second reactor; a second separator for separating solids from liquids connected to said second reactor and having a liquid and a solids outlet; a reactor-precipitator communicating with the said second separator's liquid outlet; an agitator mounted in said reactor-precipitator and equipped with driving means; an ammonia sparger in said reactor-precipitator; a third separator for separating the solids and liquids connected to said reactor-pecipitator and having a liquid and a solids outlet; and means for lowering the N to P ratio of a charge of ammonium phosphate material connected to the said third separator's solids outlet.

2. The apparatus of claim 1 wherein an agitator is mounted in said first reactor means and is equipped with driving means and a variable speed transmission; a mixing pipe communicates with said first reactor means for feeding $SO_2$ and water into said first reactor means; an $SO_2$ feed line feeds into said mixing pipe; a water feed line feeds into said mixing pipe; a pump is provided for withdrawing the reaction mixture from said first reactor means; a valve for regulating the rate at which the pump can withdraw the reaction mixture connects said first reactor means to said pump; said first separator is connected to the outlet side of said pump; a preliminary reactor is connected to the liquid outlet of said separator; an agitator mounted in said preliminary reactor and equipped with driving means and a variable speed transmission; a feed conduit communicating with said preliminary reactor to feed mineral phosphorus to said preliminary reactor; a pump for withdrawing the reaction mixture from said preliminary reactor; a valve for regulating the rate at which the pump can withdraw the reaction mixture connecting said preliminary reactor to said pump; said pump having an outlet connected to a third separator adapted to delivery unreacted mineral phosphorus solids to said first reactor means.

3. The apparatus of claim 1 wherein a liquid feed line is provided for feeding water into said first reactor means; a sparger is provided in said first reactor for feeding $SO_2$ into said first reactor means; a sulfur dioxide flow regulator is connected to said sparger for controlling the flow rates of said sulfur dioxide; a feed conduit communicates with said first reactor means to feed mineral phosphorus to said first reactor means; and wherein said means for recovering the $SO_2$ and water with the dissolved phosphorus and for feeding the $SO_2$, water and dissolved phosphorus into said first sepaartor is a pump for withdrawing the reaction mixture from said first reactor means; a valve for regulating the rate at which the pump can withdraw the reaction mixture connecting said first reactor means to said pump; said pump having an outlet connected to said first separator.

4. The apparatus of claim 1 wherein said first reactor means comprises a first renewable leach bed; a second renewable leach bed; and a third renewable leach bed; and wherein a supply conduit separately communicates with each of said leach beds for separately and alternatively supplying mineral phosphorus to each of said renewable leach beds; a first feeding outlet communicates with said first leach bed, a second feeding outlet communicates with said second leach bed; a third feeding outlet communicates with said third leach bed; a mixing mechanism is provided for mixing $SO_2$ and water; a water feed line feeds into said mixing mechanism; a flow regulator is connected to the water feed line for controlling the rate of flow of said water into said mixing mechanism; an $SO_2$ feed line feeds into said mixing mechanism; a flow regulator is connected to said $SO_2$ feed line for controlling the rate of flow of said $SO_2$ into said mixing mechanism; said mixing mechanism communicates with each of said feeding outlets for separately and alternatively supplying an $SO_2$-water mixture to each of said renewable leach beds; an outlet is provided in said first leach bed, in said second leach bed, and in said third leach bed; a first leach solution collection line is provided; a second leach solution collection line is provided; valve means connects the first said outlet with each of said leach solution collection lines for alternatively supplying leach solution to said collection lines; valve means connects the second said outlet with each of said leach solution collection lines for alternatively supplying leach solution to said collection lines; valve means connects the third said outlet with each of said leach solution collection lines for alternatively supplying leach solution to said collection lines; a connecting means connects said first leach solution collection line with each of said feeding outlets for separately and alternatively supplying leach solution to each of said renewable leach beds; and connecting means connects said second each solution collection line with the said first separator of claim 1.

5. The apparatus of claim 1 wherein said first reactor means comprises in combination a mixing-propelling mechanism for mixing $SO_2$ and water and providing the force to inject the $SO_2$ and water solution into a natural phosphate matrix; a water feed line feeding into said mixing and propelling mechanism; a flow regulator connected to the water feed line for controlling the rate of flow of said water into said mixing-propelling mechanism; an $SO_2$ feed line feeding into said mixing-propelling mechanism; a flow regulator connected to the $SO_2$ feed line for controlling the rate of flow of said $SO_2$ into said mixing-propelling mechanism; at least two concentric mining pipes penetrating through a natural overburden into a natural phosphate matrix the mixing-propelling mechanism feeding to the outer channel which is defined by the annulus between the outer concentric pipe and the next inwardly pipe; and wherein said means for recovering the $SO_2$ and water with the dissolved phosphorus and for feeding the $SO_2$-water and dissolved phosphorus into said first separator is the next inward channel of said concentric pipes, which channel feeds outwardly and is connected to said first separator.

6. The apparatus of claim 1 wherein a second precipitator-separator having liquid and vapor outlets is included, and said second precipitator-separator being connected to the liquid outlet of the first precipitator-separator; the first precipitator-separator being adapted to reduce the $SO_2$ in the liquid passing through it from a level above 3.9% on an $SO_2$ water basis to a level of from 3.9 to 2.5% on an $SO_2$ water basis by removing $SO_2$ vapor from the liquid; said second precipitator-separator being adapted to reduce the $SO_2$ of a liquid passing through it from a level above 2.5% on an $SO_2$ water basis to less than 1.8% $SO_2$ on an $SO_2$ water basis by removing $SO_2$ vapor from the liquid, and wherein a recycle system is connected at its inlet end to the liquid outlet of said second precipitator-separator and to the vapor outlets of the first and second precipitator-separators, and at its outlet end to said first reactor means.

7. The apparatus of claim 1 wherein a second precipitator-separator is included, said second precipitator-separator being connected to the liquid outlet of the first precipitator-separator; the first precipitator-separator being adapted to leave $SO_2$ in the liquid passing through it in an amount of less than 1.8% on an $SO_2$ water basis and said second precipitator-separator being adapted to remove $SO_2$ vapor from a liquid containing less than 1.8% $SO_2$ on an $SO_2$ water basis, thereby to form a precipitate in the liquid and separate the precipitate from the liquid, and wherein a recycle system is connected at its inlet end to the liquid outlet of said second precipitator-separator, and at its outlet end to said first reactor means.

8. The apparatus of claim 1 wherein said means for lowering the N to P ratio of a charge of ammonium phosphate material is a heater having sufficient heating capacity to heat an ammonium phosphate material passing through it to about 85° C. and maintain that temperature in the ammonium phosphate material for more than 5 minutes.

9. The apparatus of claim 1 wherein said means for lowering the N to P ratio of a charge of ammonium phosphate material is a mechanism adding phosphoric acid to said ammonium phosphate material; said apparatus further including mechanism for granulating said material, said mechanism comprising a blunger; a phosphoric acid liquid feed line feeding into said blunger; a set of fines, product and oversize screens downstream from said blunger; a mill downstream from the oversize screen for crushing the oversize to fines; a conveyor downstream from said fines screen and from said mill adapted to receive the fines from the fines screen and from the mill and feeding into said blunger; a surge hopper downstream from said product screen; and a rotary cooler downstream from said surge hopper.

10. The apparatus of claim 1 wherein the first precipitator-separator is a heater connected to a U-shaped flash precipitation chamber connected to a continuous centrifuge; said flash-precipitation chamber including an upwardly extending section made from a piece of cylindrical pipe with its top cut on a 45° bias, a bight section made from a piece of cylindrical pipe having the same radius as the radius of the upwardly extending section and having both ends cut on a 45° bias, said upwardly extending section and said bight section joined by welding respective 45° bias cuts together to form a right angle connection; a downwardly extending section made from a piece of cylindrical pipe having the same radius as the radius of the bight section and having its top cut on a 45° bias, the other end of said bight section and the top of said downwardly extending section joined by welding respective 45° bias cuts together to form a right angle connection, a closing plate closes the bottom of said upwardly extending section; another closing plate closes the bottom of said downwardly extending section; a demister extending across an upper region of the upwardly extending section and closing said upwardly extending section, a nozzle mounted in said upwardly extending section and below said demister; said heater being a liquid heating type; an outlet in said heater, a conduit extending through the closing plate closing the bottom of said upwardly extending section and connecting said outlet of said heater with said nozzle, an outlet in the lower region of said upwardly extending section of said flash-precipitation chamber, and said continuous centrifuge connected to said outlet from said lower region of the said upwardly extending section, a liquid outlet and a solid outlet from said continuous centrifuge; said vacuum-heat precipitator and separator adapted to reduce the $SO_2$ in the liquid passing through it from a level above 3.9% on an $SO_2$ water basis to a level of from 3.9 to 2.5% on an $SO_2$ water basis by removing $SO_2$ vapor from the liquid; a second precipitator-separator, said second precipitator-separator being a heater connected to a U-shaped flash precipitation chamber connected to a continuous centrifuge; a liquid inlet in the said heater of said second precipitator-separator, said heater is connected to the liquid outlet of the first said continuous centrifuge, said flash-precipitation chamber including an upwardly extending section made from a piece of cylindrical pipe with its top cut on a 45° bias, a bight section made from a piece of cylindrical pipe having the same radius as the radius of the upwardly extending section and having both ends cut on a 45° bias, said upwardly extending section and said bight section joined by welding respective 45° bias cuts together to form a right angle connection, a downwardly extending section made from a piece of cylindrical pipe having the same radius as the radius of the bight section and having its top cut on a 45° bias, the other end of said bight section and the top of said downwardly extending section joined by welding respective 45° bias cuts together to form a right angle connection, a closing plate closes the bottom of said upwardly extending section, another closing plate closing the bottom of said downwardly extending section, a demister extending across an upper region of the upwardly extending section and closing said upwardly extending section, a nozzle mounted in said upwardly extending section and below said demister; said heater being a liquid heating type; an outlet in said heater; a conduit extending through the closing plate closing the bottom of said upwardly extending section and connecting said outlet of said heater with said nozzle; an outlet in the lower region of said upwardly extending section of said flash-precipitation chamber, and said continuous centrifuge connected to said outlet from said lower region of said upwardly extending section, a liquid outlet and a solid outlet from said continuous centrifuge; said precipitator-separator is adapted to reduce the $SO_2$ of a liquid passing through it from a level above 2.5% on an $SO_2$ water basis to less than 1.8% $SO_2$ on an $SO_2$ water basis by removing $SO_2$ vapor from the liquid; a recycle system is connected at its inlet end to the liquid outlet of said second precipitator-separator, and to the vapor outlets of the first and second precipitator-separators, and at its outlet end to said first reactor means; and wherein said means for lowering the N to P ratio of a charge of ammonium phosphate material is a mechanism for adding phosphoric acid to said ammonium phosphate material and for granulating said material, said mechanism comprising a blunger; a phosphoric acid liquid feed line feeding into said blunger; a set of fines, product and oversize screens downstream from said blunger; a mill downstream from the oversize screen for crushing the oversize to fines; a conveyor downstream from said fines screen and from said mill adapted to receive the fines from the fines screen and from the mill and feeding into said blunger; a surge hopper downstream from said product screen; and a rotary cooler downstream from said surge hopper.

References Cited
UNITED STATES PATENTS

| | | | |
|---|---|---|---|
| 1,601,233 | 9/1926 | Blumenberg | 23—107 |
| 1,822,040 | 9/1931 | Klugh et al. | 23—107 |
| 1,944,048 | 1/1934 | Walker et al. | 23—165 |
| 2,233,956 | 3/1941 | Moore. | |
| 2,716,591 | 8/1955 | Thomsen | 23—165 |
| 2,738,258 | 3/1956 | Berg | 23—165 XR |
| 3,025,131 | 3/1962 | Lerner | 23—260 XR |
| 3,171,733 | 3/1965 | Hignett et al. | |
| 3,214,260 | 10/1965 | Oi et al. | 23—107 XR |
| 3,226,184 | 12/1965 | Brownlie et al. | 23—107 |
| 3,359,037 | 12/1967 | Every et al. | 23—165 XR |
| 3,437,379 | 4/1969 | Dunseth et al. | 23—312 XR |

FOREIGN PATENTS 938,468  10/1963  Great Britain.

MORRIS O. WOLK, Primary Examiner

B. S. RICHMAN, Assistant Examiner

U.S. Cl. X.R.

23—106, 165, 312; 299—5